(12) United States Patent
Kim et al.

(10) Patent No.: US 12,370,950 B2
(45) Date of Patent: Jul. 29, 2025

(54) ARTIFICIAL INTELLIGENCE-BASED SMART REARVIEW MIRROR CONTROL METHOD AND DEVICE AND SYSTEM THEREFOR

(71) Applicant: UNITEL ELECTRONICS CO., LTD., Seoul (KR)

(72) Inventors: Jung Won Kim, Gimpo-si (KR); Yu Sung Moon, Incheon (KR)

(73) Assignee: UNITEL ELECTRONICS CO., LTD., Seoul (KR)

( * ) Notice: Subject to any disclaimer, the term of this patent is extended or adjusted under 35 U.S.C. 154(b) by 318 days.

(21) Appl. No.: 18/209,443

(22) Filed: Jun. 13, 2023

(65) Prior Publication Data
US 2024/0416838 A1  Dec. 19, 2024

(51) Int. Cl.
*B60R 1/27* (2022.01)
*G06V 20/58* (2022.01)
(Continued)

(52) U.S. Cl.
CPC .............. *B60R 1/27* (2022.01); *G06V 20/58* (2022.01); *G06V 40/13* (2022.01); *G06V 40/1347* (2022.01); *G06V 40/1365* (2022.01); *G06V 40/19* (2022.01); *G06V 40/193* (2022.01); *G06V 40/197* (2022.01); *G10L 17/22* (2013.01);
(Continued)

(58) Field of Classification Search
CPC . B60R 1/27; B60R 2300/105; B60R 2300/20; B60R 2300/607; B60R 2300/8066; B60R 2001/1253; B60R 1/12; G06V 20/58; G06V 40/13; G06V 40/1347; G06V 40/1365; G06V 40/19;
(Continued)

(56) References Cited

U.S. PATENT DOCUMENTS

| 2015/0161836 A1* | 6/2015 | Park .................. G06F 21/36 340/5.51 |
| 2017/0013188 A1 | 1/2017 | Kothari |

(Continued)

FOREIGN PATENT DOCUMENTS

JP  2021-103580 A  7/2021

*Primary Examiner* — Wassim Mahrouka
(74) *Attorney, Agent, or Firm* — Revolution IP, PLLC

(57) ABSTRACT

An artificial intelligence-based smart rearview mirror control method, includes: performing a booting procedure according to power application; recognizing user gesture when the screen of an always-on-display (AOD) touch display is inactive; activating the inactivated touch display screen according to the recognition of the user gesture, outputting a user interface screen for controlling the smart rearview mirror, and then waiting for a user voice input; performing machine learning on a user voice signal input through a microphone to recognize a voice command for user authentication and smart rearview mirror control; and in case the user authentication is successful, configuring a view screen based on the recognized voice command and displaying the same on the smart rearview mirror; and the user authentication including speaker independent authentication performing authentication only for a specific speaker pre-registered and speaker dependent authentication for performing authentication for all speakers registered in a database.

9 Claims, 9 Drawing Sheets

(51) Int. Cl.
  *G06V 40/12*   (2022.01)
  *G06V 40/13*   (2022.01)
  *G06V 40/18*   (2022.01)
  *G06V 40/19*   (2022.01)
  *G10L 17/22*   (2013.01)
  *H04N 7/18*    (2006.01)
  *H04N 23/66*   (2023.01)

(52) U.S. Cl.
  CPC ............ *H04N 7/181* (2013.01); *H04N 23/66* (2023.01); *B60R 2300/105* (2013.01); *B60R 2300/20* (2013.01); *B60R 2300/607* (2013.01); *B60R 2300/8066* (2013.01)

(58) Field of Classification Search
  CPC .... G06V 40/193; G06V 40/197; G10L 17/22; H04N 7/181; H04N 23/66; G06F 21/32
  See application file for complete search history.

(56) References Cited

U.S. PATENT DOCUMENTS

| | | | | |
|---|---|---|---|---|
| 2019/0354331 | A1* | 11/2019 | Neugarten | G06F 3/0482 |
| 2021/0174813 | A1* | 6/2021  | Huh       | G06N 3/08   |
| 2021/0295857 | A1* | 9/2021  | Ouyang    | G10L 15/20  |
| 2022/0208039 | A1* | 6/2022  | Liu       | G06F 3/167  |

* cited by examiner

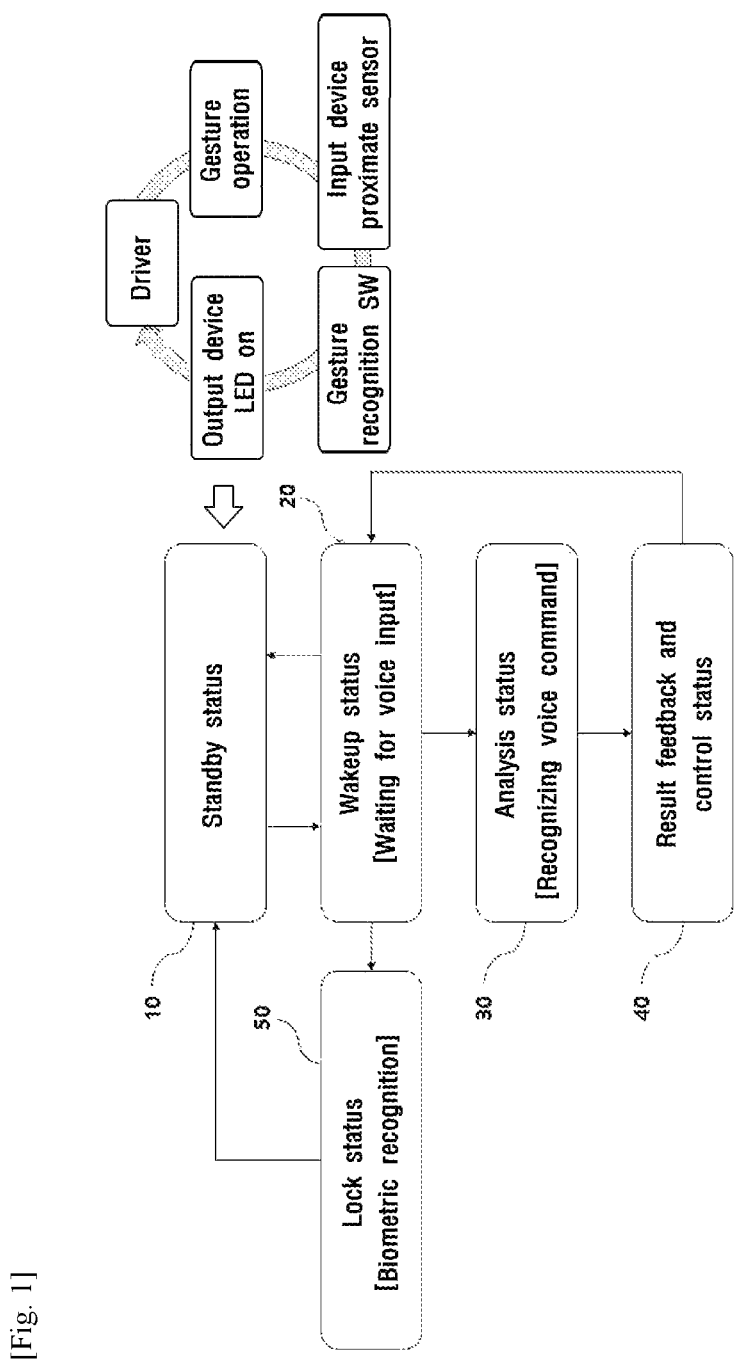
[Fig. 1]

[Fig. 2]
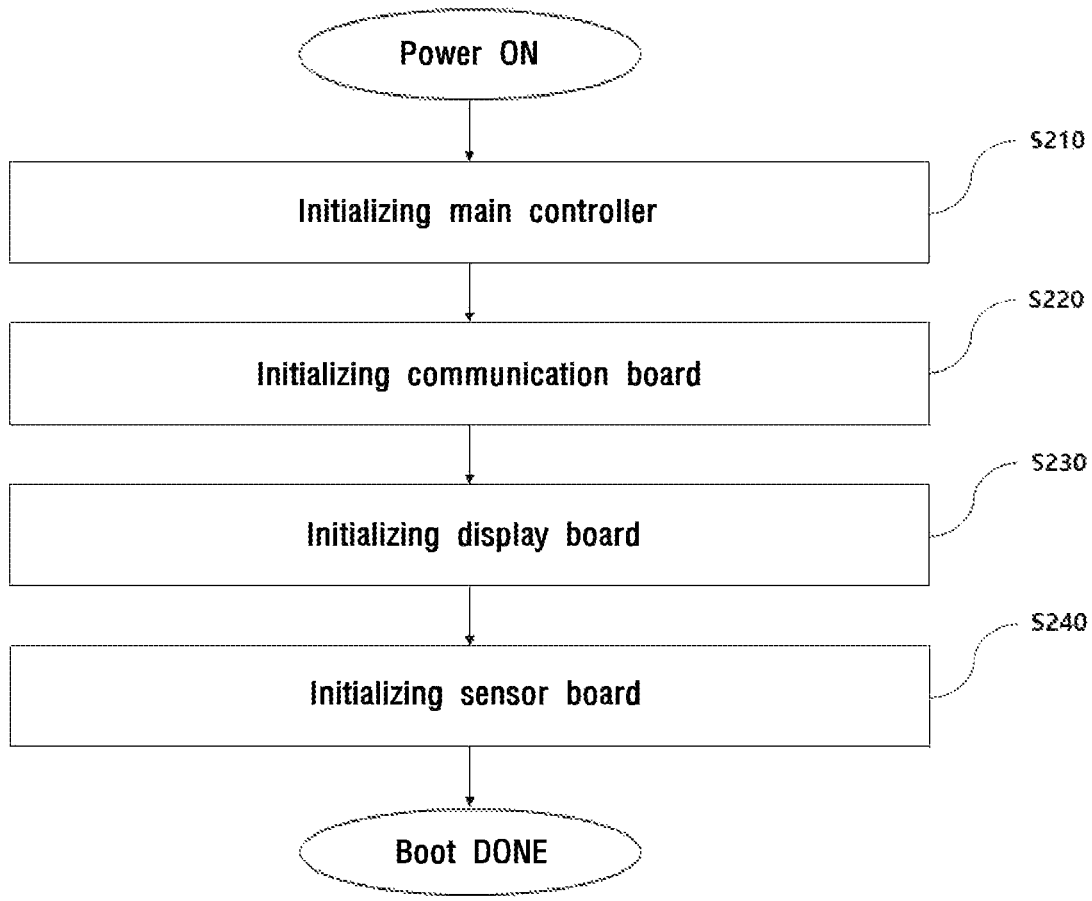

[Fig. 3]
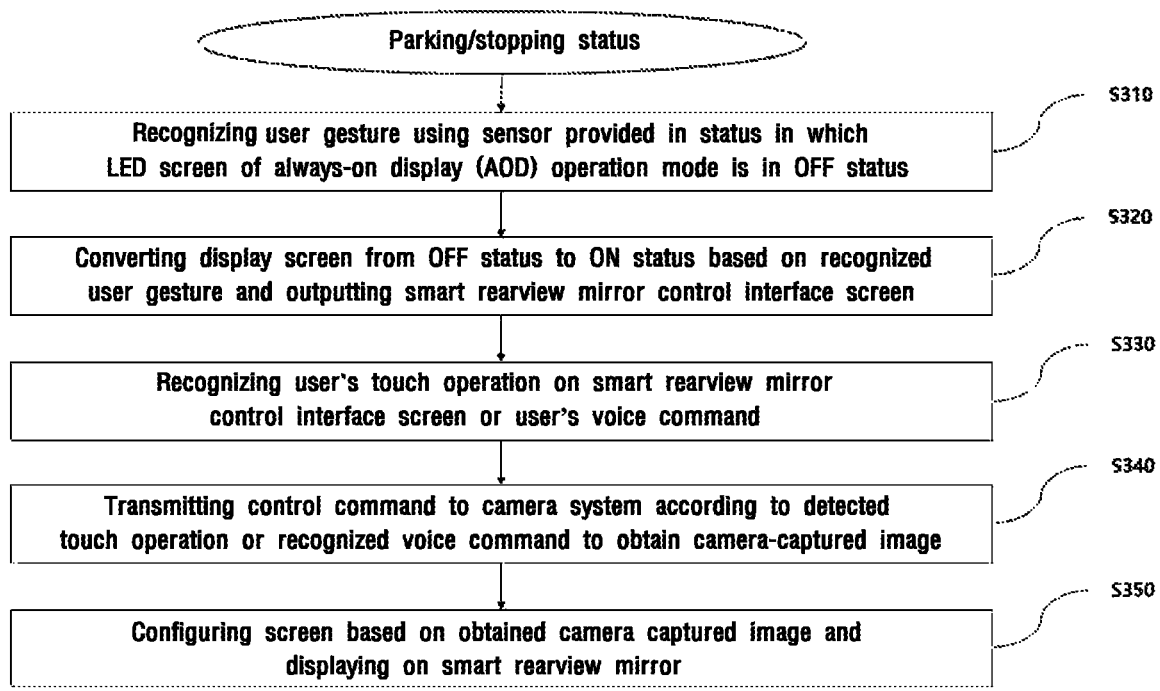

[Fig. 4]
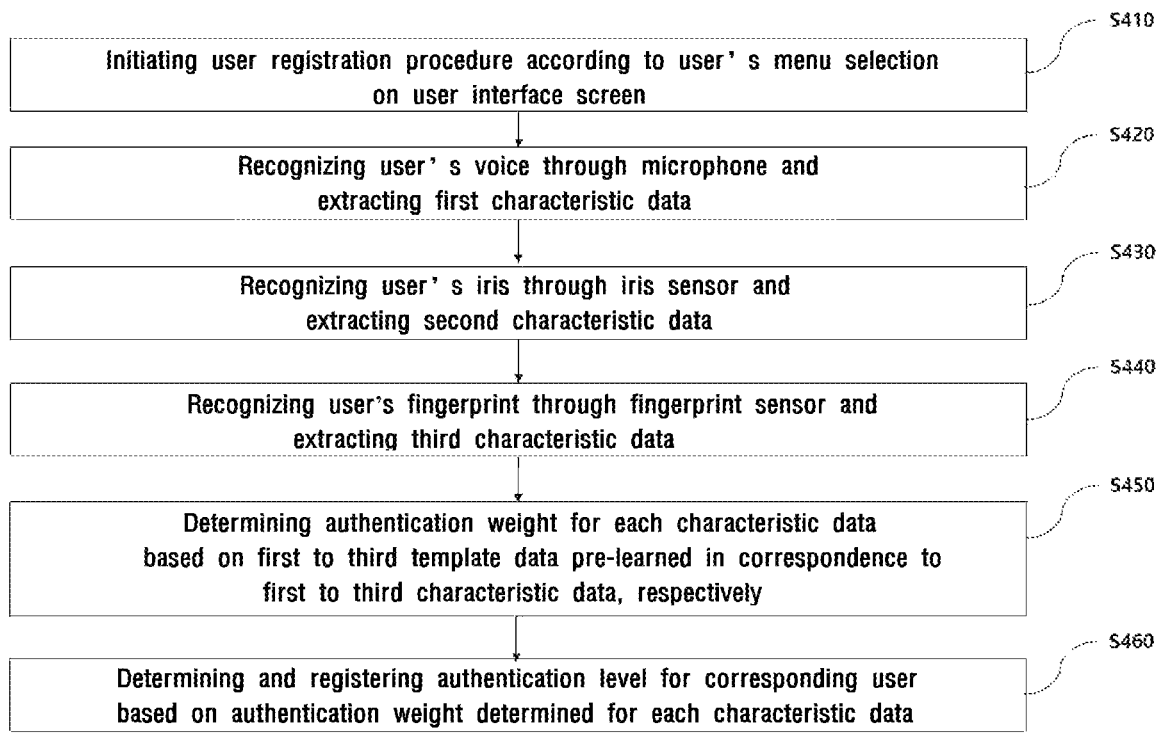

[Fig. 5]
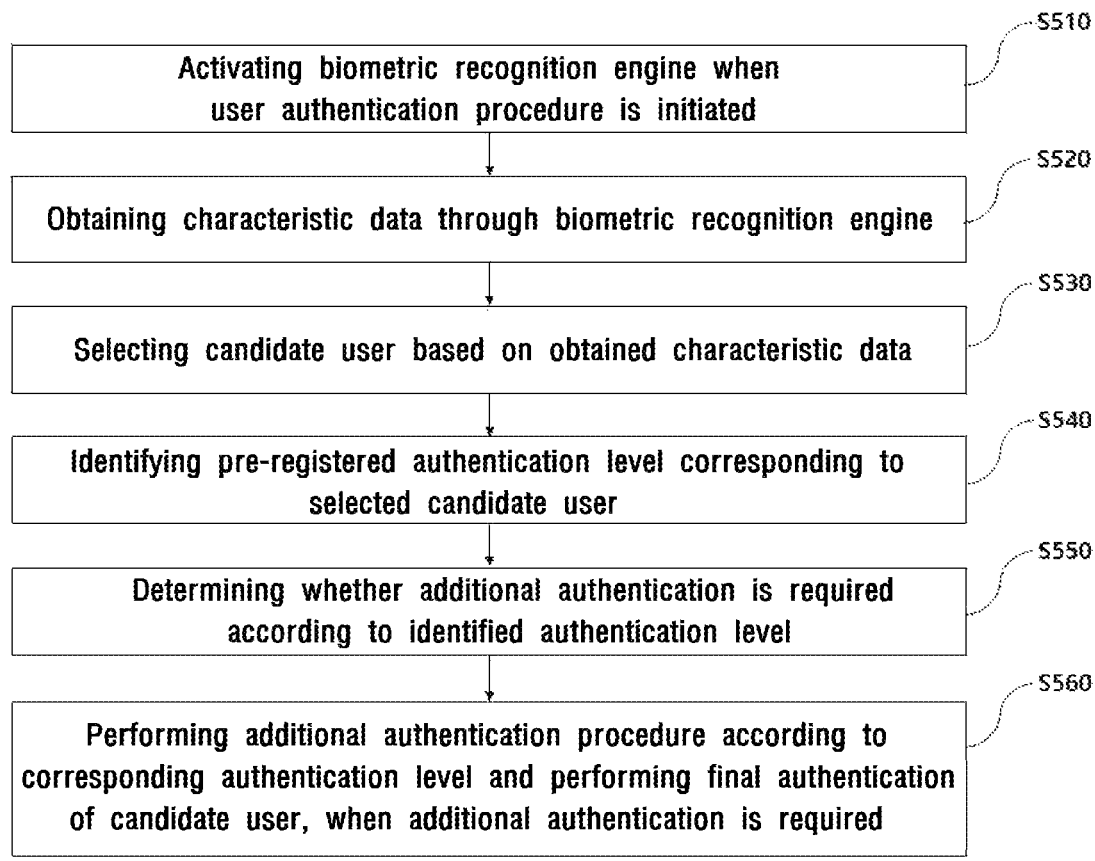

[Fig. 6]
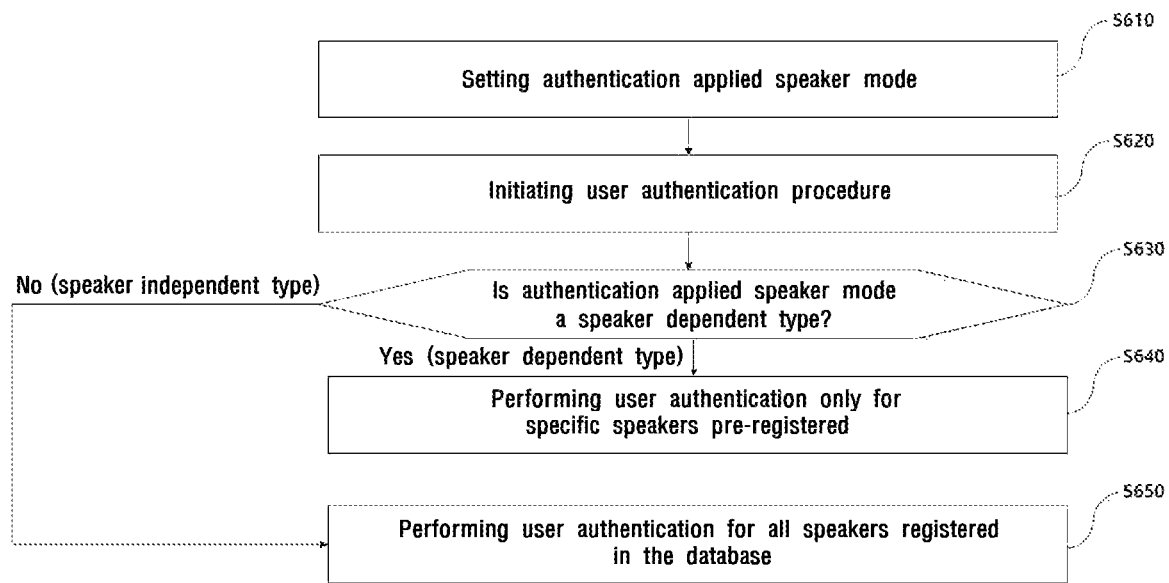

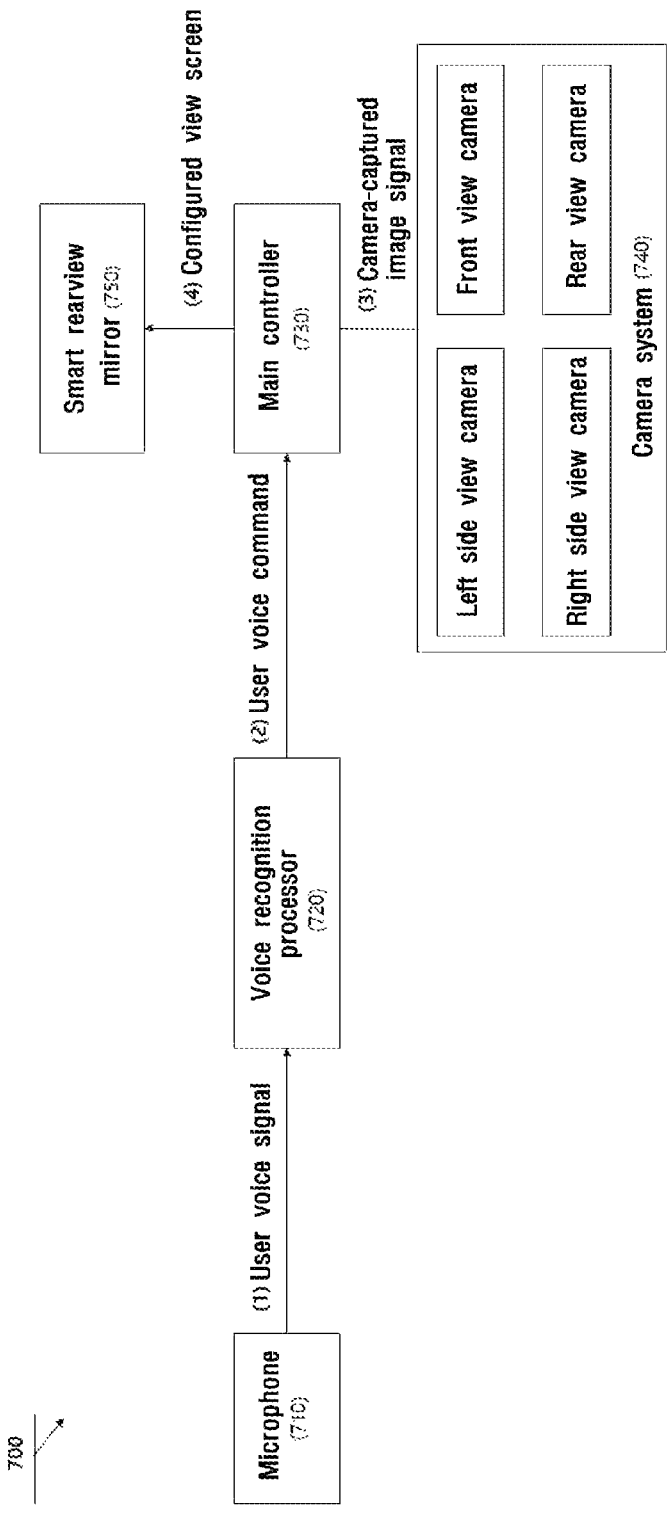
[Fig. 7]

[Fig. 8]
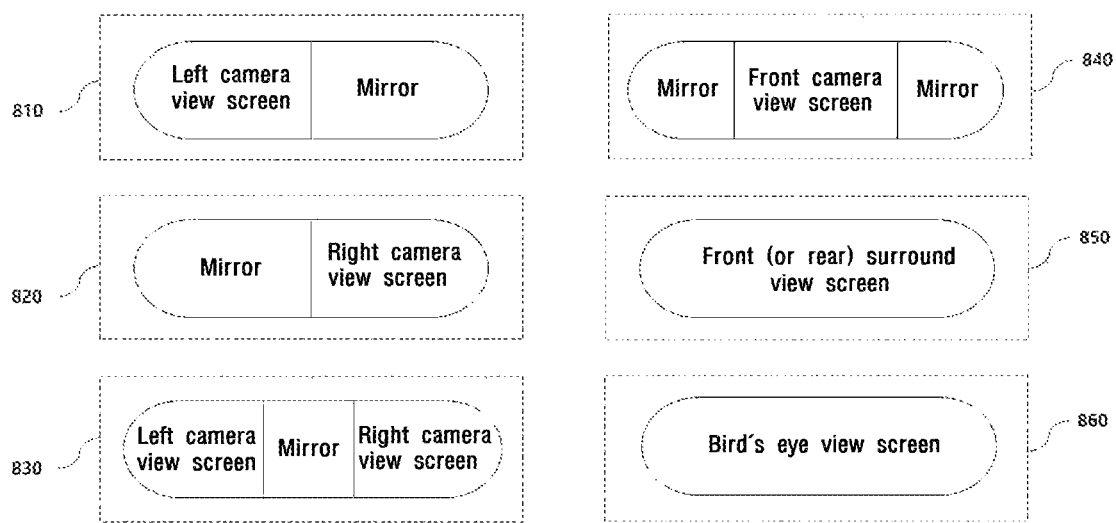

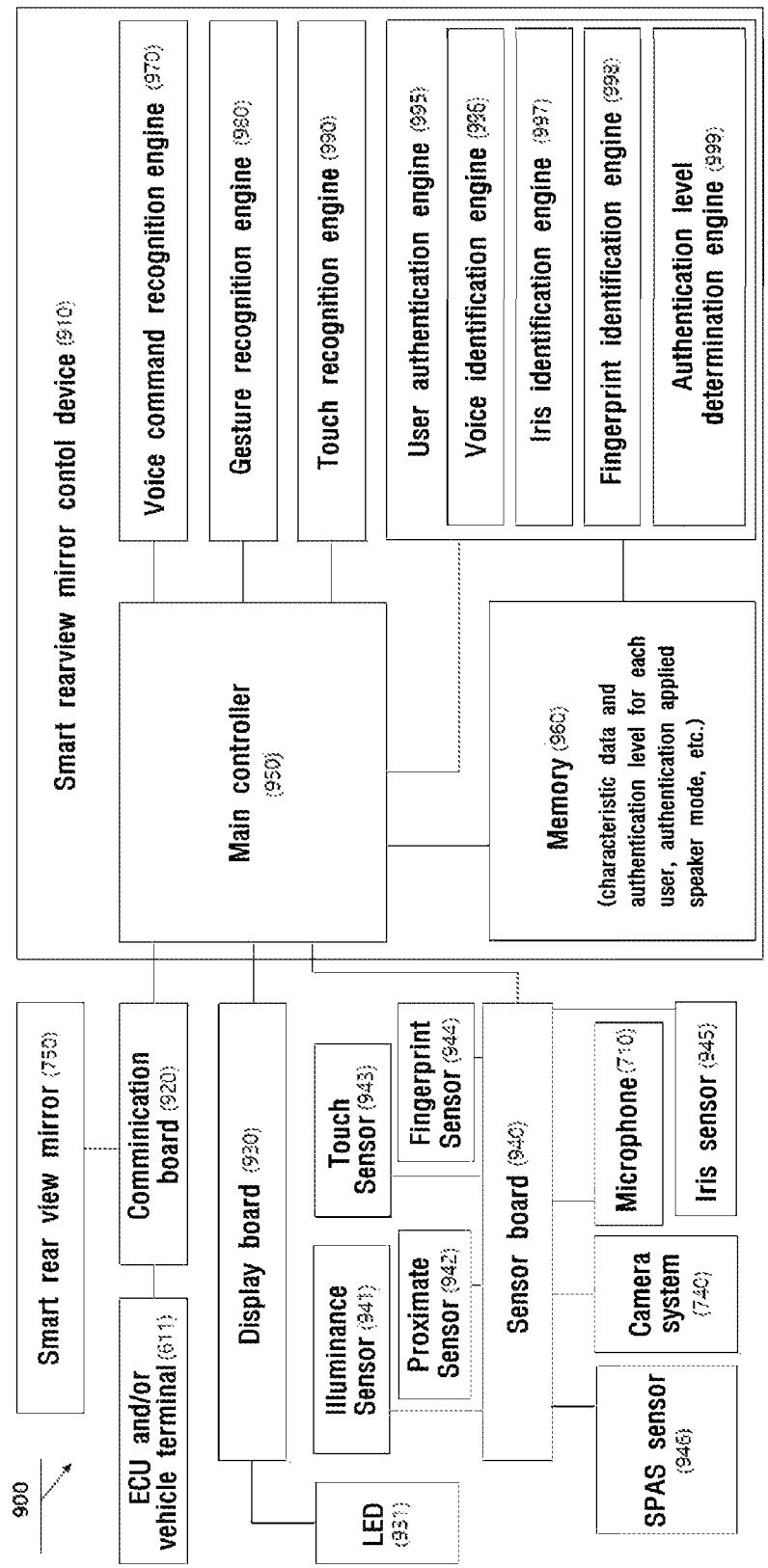
[Fig. 9]

ARTIFICIAL INTELLIGENCE-BASED SMART REARVIEW MIRROR CONTROL METHOD AND DEVICE AND SYSTEM THEREFOR

TECHNICAL FIELD

The present invention relates to a smart rearview mirror control technology. More specifically, the present invention relates to a smart rearview mirror control method capable of dynamically controlling a view screen of an artificial intelligence-based smart rearview mirror, and a device and system therefor.

BACKGROUND ART

Recently, cars provide safety and convenience to drivers through various advanced driver assistance systems (ADASs) such as lane departure warning (LDW), adaptive cruise control (ACC), forward-collision warning (FCW), blind-spot detection (BSD), etc.

The most important technology in such intelligence system is the technology for recognizing external objects. Such technology includes sensors such as cameras, radars, ultrasonic waves, and LiDARs. These sensors may provide safety and convenience in driving and parking situations through lane detection and vehicle detection in the front and rear and blind spots.

Cameras are devices essentially used in autonomous driving environments of level 2 or above, such as collision prevention, lane keeping, parking assistance, etc., and their use is on the increase as installation of cameras is becoming mandatory in many countries.

In addition, these sensors can effectively avoid accidents even in situations difficult to be detected with environmental sensors such as intersections, in conjunction with vehicle to everything (V2X) communication systems.

In order to overcome the weaknesses of individual sensors, sensor fusion technologies combining sensor information are actively being developed, and technologies for next-generation sensors such as stereo cameras, 3-dimensional image sensors, etc. are also actively being developed.

In the global image sensor market, cars play an important role, along with smartphones and digital cameras. In particular, the recent spread of ADAS and the development of autonomous vehicles are creating a better environment for cars to adopt image sensors.

Automobile companies are replacing mirrors with displays in digital rear-view mirrors and around-view monitoring systems to detect blind spots to secure the safety of drivers and pedestrians. In fact, vehicles such as the Infiniti Q80, Volkswagen XL1, Toyota NS4, etc. have completely removed side mirrors and installed an around-view system and display, instead.

The around-view monitor or surround-view monitor is a monitor system that provides images as if looking down from the sky by installing four cameras on the front, rear, left and right sides of the vehicle and synthesizing the images. It may also be called as top view or bird's eye view.

However, the currently available digital rearview mirrors provide only a simple around-view, but cannot provide various view screens according to the user's intention.

SUMMARY OF INVENTION

Task to be Solved

It is an object of the present invention to provide a voice recognition artificial intelligence-based smart rearview mirror control method, and a device and system therefor.

It is another object of the present invention to provide an artificial intelligence-based smart rearview mirror control method capable of performing customized user authentication by obtaining template data for each authentication means through pre-learning sensing information collected from various authentication sensors, comparing the obtained template data with characteristic data for each authentication means obtained in real time to determine the authentication weight for each authentication means and setting an optimal authentication level for each user based on the determined authentication weight, and a device and system therefor.

It is yet another object of the present invention to provide a voice recognition artificial intelligence-based smart rearview mirror control method capable of providing user convenience and driving safety by controlling a view screen of a smart rearview mirror through voice recognition while driving, and a device and system therefor.

The technical tasks of the present invention are not limited to the technical tasks mentioned above, and other technical tasks not mentioned can be clearly understood by those skilled in the art from the following description.

Means for Solving Task

According to an aspect, a smart rearview mirror control method in a smart rearview control device installed in a vehicle may comprise: performing a booting procedure according to power application; recognizing user gesture when the screen of an always-on-display (AOD) touch display is inactive; activating the inactivated touch display screen according to the recognition of the user gesture, outputting a user interface screen for controlling the smart rearview mirror, and then waiting for a user voice input; performing machine learning on a user voice signal input through a microphone to recognize a voice command for user authentication and smart rearview mirror control; and in case the user authentication is successful, configuring a view screen based on the recognized voice command and displaying the same on the smart rearview mirror; and the user authentication may comprise speaker independent authentication performing authentication only for a specific speaker pre-registered and speaker dependent authentication for performing authentication for all speakers registered in a database.

In an embodiment, the booting procedure may comprise: initializing a main controller controlling the overall input and output of the smart rearview mirror control device; connecting communication with a plurality of cameras; initializing a display board to control the touch display screen output; and initializing a sensor board configured to calibrate at least one sensor and collect sensing information from the at least one sensor; wherein the sensor may comprise at least one of an illuminance sensor, a proximate sensor, a touch sensor, a fingerprint sensor and an iris sensor.

In an embodiment, the method may further comprise: detecting a user's touch operation on the user interface screen based on the fact that the control mode of the smart rearview mirror is in manual control mode, and when the touch operation is detected, recognizing a smart camera control command corresponding to the touch operation and configuring the view screen by obtaining a corresponding camera-captured image according to the recognized smart camera control command.

In an embodiment, the method may further comprise: determining a view type corresponding to the recognized voice command based on the fact that the control mode of the smart rearview mirror is in voice control mode; determining at least one camera to receive a captured image corresponding to the determined view type; and configuring the view screen based on the captured image obtained from the determined at least one camera, and the view type may comprise at least one of a front view, a left side view, a right side view, a rear view, a left/right side view, a front surround view, a rear surround view and a bird's eye view.

In an embodiment, the method may comprise: initiating a user registration procedure according to a predetermined user menu selection on the user interface screen; extracting characteristic data for each user authentication means; extracting first characteristic data by recognizing a user's voice from a voice signal input through the microphone; extracting second characteristic data by recognizing a user's iris from an image captured through the camera; extracting third characteristic data by recognizing a user's fingerprint through a fingerprint sensor; determining an authentication weight for each characteristic data based on first to third template data pre-learned in correspondence to the first to third characteristic data, respectively; and determining an authentication level for the corresponding user based on the authentication weight determined for each characteristic data, and the extracted characteristic data for each user and information on the determined authentication level may be stored and managed in an internal memory.

In an embodiment, the method may further comprise: detecting a proximate obstacle using a smart parking assistance system (SPAS) sensor provided while driving the vehicle, and information on the detected proximate obstacle may be displayed on one side of the view screen based on the proximate obstacle detected.

According to another aspect, a smart rearview control system installed in a vehicle may comprise: a microphone providing a voice signal input by a user; a smart rearview mirror provided with a digital display device; a camera system capturing the front, left/right sides, and rear of the vehicle; and a smart rearview control device performing voice recognition on the voice signal using a built-in voice recognition engine based on the fact that the control mode of the smart rearview mirror is in voice control mode, receiving an image captured by at least one camera from the camera system according to a user's voice command identified through the voice recognition, dynamically configuring a view screen based on at least one of the received images, and providing the configured view screen to the smart rearview mirror.

In an embodiment, the smart rearview mirror control device may further perform user authentication based on the voice signal, and the user authentication may comprise speaker independent authentication performing authentication only for a specific speaker pre-registered and speaker dependent authentication for performing authentication for all speakers registered in a database.

In an embodiment, the smart rearview mirror control device may detect a proximate obstacle using a smart parking assistance system (SPAS) sensor provided while driving the vehicle, and display information on the detected proximate obstacle on one side of the view screen based on the proximate obstacle detected.

The technical tasks of the present invention are not limited to the technical tasks mentioned above, and other technical tasks not mentioned can be clearly understood by those skilled in the art from the following description.

Effect of Invention

The present invention has an advantage of providing a voice recognition artificial intelligence-based smart rearview mirror control method, and a device and system therefor.

In addition, the present invention has an advantage of providing a user-customized smart rearview mirror control technology capable of minimizing user inconvenience for complex user authentication by performing minimum authentication procedure according to the authentication level determined for each user based on artificial intelligence.

In addition, the present invention has an advantage of providing driving safety by conveniently controlling the smart rearview mirror screen while driving by using voice recognition artificial intelligence.

In addition, the present invention has an advantage of providing a smart rearview mirror control device capable of effectively blocking unnecessary power waste.

In addition, the present invention has an advantage of providing a safer and more convenient voice recognition interaction system by providing various user authentication engines and voice recognition engines through an artificial intelligence platform.

In addition to the above, various effects identified directly or indirectly through the present document may be provided.

BRIEF DESCRIPTION OF DRAWINGS

FIG. 1 is a status diagram for an artificial intelligence voice recognition-based smart rearview mirror control device according to an embodiment;

FIG. 2 is a flowchart for illustrating an initial booting procedure of a smart rearview mirror control device according to an embodiment;

FIG. 3 is a flowchart for illustrating a smart rearview mirror control method in a smart rearview mirror control device in a parking/stopping status according to an embodiment;

FIG. 4 is a flowchart for illustrating a user registration procedure of a smart rearview mirror control device according to an embodiment;

FIG. 5 is a flowchart for illustrating a user authentication procedure of a smart rearview mirror control device according to an embodiment;

FIG. 6 is a flowchart for illustrating a user authentication procedure according to an authentication applied speaker mode according to an embodiment;

FIG. 7 is a block diagram for illustrating the configuration of a voice recognition AI-based smart rearview mirror system according to an embodiment;

FIG. 8 is an example of a view screen provided by a smart rearview mirror system according to an embodiment; and FIG. 9 is a block diagram for illustrating the detailed structure of a smart rearview mirror system according to an embodiment of the present invention.

BEST MODE FOR CARRYING OUT THE INVENTION

Hereinafter, some embodiments of the present invention will be described in detail through exemplary drawings. In adding reference numerals to the components of each drawing, it should be noted that the same components have the same numerals as much as possible even if they are displayed on different drawings. In addition, in describing an embodiment of the present invention, when it is determined that a detailed description of a related known configuration or function hinders understanding of the embodiment of the present invention, the detailed description thereof will be omitted.

In describing the components of the embodiment of the present invention, terms such as first, second, A, B, (a), and (b) may be used. These terms are only used to distinguish the component from other components, and the nature, sequence, or order of the corresponding component is not limited by the term. In addition, unless defined otherwise, all terms used herein, including technical or scientific terms, have the same meaning as commonly understood by a person of ordinary skill in the art to which the present invention belongs. Terms such as those defined in commonly used dictionaries should be interpreted as having a meaning consistent with the meaning in the context of the related art, and unless explicitly defined in this application, should not be interpreted in an ideal or excessively formal meaning.

FIG. 1 is a status diagram for an artificial intelligence voice recognition-based smart rearview mirror control device according to an embodiment.

Referring to FIG. 1, the smart rearview mirror control status (or smart room mirror control device) may largely include standby status 10, wakeup status 20, analysis status 30, result feedback and control status 40, and lock status 50.

Standby status 10 may mean a status waiting for the driver to input a specific gesture when the smart rearview control device (or smart rearview mirror control switch) for controlling the vehicle rearview mirror is in always-on-display (AOD) operation mode while the vehicle is stopped or running. In standby status 10, the display screen, for example, touch LED screen of the smart rearview control device may be in an inactive status, in other words, in an OFF status.

For example, when the driver performs a predetermined or pre-registered gesture operation in a smart rearview mirror control device in standby status 10, the smart rearview mirror control device may recognize the driver's gesture operation through a proximate sensor provided, and convert the display screen in an inactive status to an active status, in other words, ON status, based on the fact that the recognized gesture corresponds to the predetermined/pre-registered gesture.

When the display screen is activated, the smart rearview mirror control device may transit from standby status 10 to wakeup status 20, and output a predetermined notification message notifying that the user's voice can be recognized through the vehicle speaker.

When a user's voice is input through a microphone provided in wakeup status 20, the smart rearview mirror control device may transit to analysis status 30.

The smart rearview mirror control device may recognize a user's voice command, for example, wakeup word by analyzing through an artificial intelligence voice recognition engine provided with a user's voice command input in analysis status 30.

When voice recognition is normally completed, the smart rearview control device may transit to result feedback and control status 40, and transmit a predetermined control command corresponding to the voice recognition result to the camera system. The camera system may transmit an image captured by a corresponding camera to the smart rearview mirror control device according to a control command received from the smart rearview mirror control device. The smart rearview mirror control device may output an image received at the camera system through a screen provided in the rearview mirror.

In an embodiment, the smart rearview mirror control device may simultaneously receive images captured by a plurality of cameras. In this case, the smart rearview mirror control device may adaptively configure a screen according to the type of cameras from which images are received and output the image to the rearview mirror. For example, the camera may include a front camera, a left/right side view camera, and a rear camera.

For example, when the smart rearview mirror control device receives an image captured by the left/right side view camera, the left half of the rearview mirror screen may be controlled to display an image captured by the left side view camera, and the right half of the rearview mirror screen may be controlled to display an image captured by the right side view camera.

As another example, when the smart rearview mirror control device receives an image captured by the left/right side view camera, the rearview mirror screen may be divided into three regions, a first region (left), a second region (middle), and a third region (right). The first region may be controlled to display an image captured by the left side view camera, the second region may be controlled to operate as a room mirror, and the third region may be controlled to display an image captured by the right side view camera.

As another example, when the smart rearview mirror control device receives an image captured by the left/right side view camera and the front camera, the smart rearview mirror control device may configure a front surround view screen based on the received images and output the image on the rearview mirror.

As another example, when the smart rearview mirror control device receives an image captured by the left/right side view camera and the rear camera, the smart rearview mirror control device may configure a rear surround view screen based on the received images and output the image on the rearview mirror.

As another example, when the smart rearview mirror control device receives an image captured by the front camera, the left/right side view cameras and the rear camera, the smart rearview mirror control device may configure a bird's eye view screen based on the received images and output the image on the rearview mirror.

When user voice recognition fails in analysis status 30, the smart rearview mirror control device may transit to result feedback and control status 40, and output a predetermined notification message notifying the failure of voice recognition through the vehicle speaker (or on rearview mirror screen).

According to the preset security and/or lock mode, the smart rearview mirror control device may perform user identification and authentication through machine learning (or deep learning) on the input voice signal.

When user identification and authentication are successful, the smart rearview mirror control device may identify the user's voice command through voice recognition and control the rearview mirror screen. When user identification or authentication fails, the smart rearview mirror control device may output a predetermined warning alarm message notifying that the user identification or authentication has failed, and transit from result feedback and control status 40 to wakeup status 20.

When user identification and authentication failed a predetermined number of times or more, the smart rearview mirror control device may output a predetermined warning alarm message notifying that the user is an unregistered user, and then transit to lock status 50. For example, in lock status 50, the smart rearview mirror may be used only for the function of a room mirror.

According to the preset security and/or lock mode level, in lock status 50, the smart rearview mirror control device may perform at least one biometric recognition among fingerprint recognition, iris recognition, face recognition and weight recognition to perform user identification and authentication. When biometric recognition is successful, the smart rearview mirror control device may transit from wakeup status 20 and wait for a user's voice command.

When a driver verbalizes a pre-registered or predetermined start command in standby status 10 according to the menu setting, the smart rearview mirror control device may convert the inactive display screen into an active status, in other words, into an ON status.

In an embodiment, when result report is completed, the smart room mirror control device may return to wakeup status 20 and wait for the next user command.

The smart rearview mirror control device may drive a wakeup timer for a predefined time each time the device enters wakeup status 20. The smart rearview mirror control device may recognize a voice command for controlling the smart rearview mirror only when the wakeup timer is running. When the wakeup timer expires, the smart rearview mirror control device may transit to standby status 10 and inactivate the display screen.

The smart rearview mirror control device according to an embodiment may transit to standby status 20 when user identification and authentication failed a predetermined number of times or more in wakeup status 20 according to the menu setting.

The smart rearview mirror control device according to an embodiment may detect a quit command pre-registered in any one status of wakeup status 20, analysis status 30 and result feedback and control status 40 through voice recognition, or transit to standby status 10 when receiving a specific control signal, for example, a specific button input signal provided in the smart rearview mirror control device.

FIG. 2 is a flowchart for illustrating an initial booting procedure of a smart rearview mirror control device according to an embodiment.

When power is applied, the smart rearview mirror control device may initialize the main controller, in other words, the processor through a boot/loader (S210).

The main controller may initialize a communication board for communication with external devices and systems (S220).

For example, when the communication board is initialized, the smart rearview mirror control device may interlock with various electric control units (ECUs) and vehicle terminals provided in the vehicle. The smart rearview mirror control device may interwork with external devices, such as a road side unit (RSU), a base station, and other vehicle terminals, through a vehicle terminal. For example, the smart rearview mirror control device may obtain ambient image signals captured by the RSU through a vehicle terminal and image signals captured by other vehicle terminals. In this case, the smart rearview mirror control device may display an ambient image captured by the RSU and/or an image captured by other vehicle terminals through its own smart rearview mirror.

In addition, the main controller may initiate the display board and activate the AOD operation mode (S230).

The main controller may initialize the sensor board and complete the booting operation of the smart rearview mirror control device (S240). The main controller may receive, through the sensor board, an image signal captured by a vehicle camera and a user voice signal input through a microphone. In addition, the main controller may receive, through the sensor board, an iris recognition signal, a fingerprint recognition signal, a gesture recognition signal, a touch recognition signal, an illuminance sensing signal, etc.

The main controller may maintain sensing accuracy of the sensors by performing calibration on various sensors connected to the sensor board. Here, the sensor connected to the sensor board may include a touch sensor, a gesture sensor, a microphone, a camera, an iris recognition sensor, a fingerprint recognition sensor, etc., but is not limited thereto.

The main controller according to an embodiment may transmit and receive signals to and from various cameras installed in the vehicle through a communication board.

FIG. 3 is a flowchart for illustrating a smart rearview mirror control method in a smart rearview mirror control device in a parking/stopping status according to an embodiment.

Referring to FIG. 3, in a status in which the LED screen of always-on display (AOD) operation mode is in inactive status, in other words, in screen off status, the smart rearview mirror control device may recognize the user gesture through a sensor provided, for example, a proximate sensor (S310).

The smart rearview mirror control device may convert the display screen from an OFF status to an ON status based on the recognized user gesture and output a smart rearview mirror control interface screen (S320).

The smart rearview mirror control device may recognize a user's touch operation on the smart rearview mirror control interface screen or a user's voice command (S330).

For example, the smart rearview mirror control interface screen may include a touch button for selecting the type of camera image to be displayed on the smart rearview mirror, a touch button for controlling the on/off of the smart rearview mirror, and a touch button for biometric recognition, but is not limited thereto. Here, the camera image type, in other words, the view type, may include a front view, a left side view, a right side view, a rear view, a left/right side view, a front surround view, a rear surround view, a bird's eye view, etc., but is not limited thereto.

Also, the user's voice command may include predetermined voice commands for selecting the type of camera image to be displayed on the rearview mirror. For example, the voice command may include a front view, a left side view, a right side view, a rear view, a left/right side view, a front surround view, a rear surround view, and a bird's eye view, but is not limited thereto.

The smart rearview mirror control device may transmit a predetermined control command to the camera system according to a detected touch operation or a recognized voice command to obtain a captured image of the corresponding camera(s) (S340).

The smart rearview mirror control device may configure a screen based on the obtained camera captured image(s) and display the same on the smart rearview mirror (S350).

FIG. 4 is a flowchart for illustrating a user registration procedure of a smart rearview mirror control device according to an embodiment.

Referring to FIG. 4, the smart rearview mirror control device may initiate a user registration procedure according to a user's menu selection on a user interface screen (S410).

The smart rearview mirror control device may recognize the user's voice through the microphone and extract first characteristic data (S420).

The smart rearview mirror control device may recognize the user's iris through the iris sensor and extract second characteristic data (S430).

The smart rearview mirror control device may recognize the user's fingerprint through the fingerprint sensor and extract third characteristic data (S440).

The smart rearview mirror control device may determine an authentication weight for each characteristic data based on first to third template data pre-learned in correspondence to the first to third characteristic data, respectively (S450).

An authentication level for the corresponding user may be determined and registered based on the authentication weight determined for each characteristic data (S460). Here, the characteristic data extracted for each user and information on the determined authentication level may be stored and maintained in a user database and managed.

For example, some people may have stronger voice characteristics than other people. This may mean that user identification and authentication are easier through voice. Also, some people may have weak voice characteristics, but strong iris characteristics. In this case, user identification and authentication accuracy may be improved by setting a higher authentication weight for the iris than for the voice. As described above, by adaptively determining the authentication weight based on the characteristics of authentication data for each user and determining the optimal authentication level accordingly, the present invention is not only capable of improving the reliability of user identification and authentication, but also capable of minimizing user inconvenience by minimizing unnecessary user authentication.

In the embodiment of FIG. 4, voice recognition, iris recognition, fingerprint recognition, etc. have been described as user authentication means, but this is only an embodiment, and other biometric means such as face recognition and weight recognition may be additionally applied.

FIG. 5 is a flowchart for illustrating a user authentication procedure of a smart rearview mirror control device according to an embodiment.

Referring to FIG. 5, the smart rearview mirror control device may activate a biometric recognition engine when a user authentication procedure is initiated (S510).

Here, the biometric recognition engine may include at least one of a voice recognition engine, an iris recognition engine, a fingerprint recognition engine, a face recognition engine, and a gesture recognition engine.

The smart rearview mirror control device may obtain at least one characteristic data through at least one biometric recognition engine (S520).

The smart rearview mirror control device may select a candidate user from the user database based on the obtained characteristic data (S530). Here, a plurality of candidate users may be provided according to characteristic data.

The smart rearview mirror control device may identify a pre-registered authentication level corresponding to the selected candidate user (S540).

The smart rearview mirror control device may determine whether additional authentication is required according to the identified authentication level (S550).

When additional authentication is required, the smart rearview mirror control device may perform an additional authentication procedure according to the corresponding authentication level and perform final authentication of the candidate user(s) (S560).

In step 450, when it is determined that additional authentication is not required, the smart rearview mirror control device may determine the selected candidate user as the final authenticated user.

As described above, the present invention has an advantage of identifying and authenticating a user more effectively by adaptively determining a biometric means for user authentication according to a pre-registered authentication level.

In addition, the present invention has an advantage of minimizing user inconvenience by performing a minimal authentication procedure according to a predetermined authentication level for each user.

FIG. 6 is a flowchart for illustrating a user authentication procedure according to an authentication applied speaker mode according to an embodiment.

Referring to FIG. 6, the smart rearview mirror control device may set an authentication applied speaker mode through a user's selection of a predetermined menu (S610).

Here, the authentication applied speaker mode may be divided into a speaker dependent mode and a speaker independent mode.

The speaker dependent mode is a mode in which the user authentication procedure is performed only for speakers pre-registered (pre-selected) by the user.

The speaker independent mode is a mode in which the user authentication procedure is performed for all speakers registered in the database.

In the case of speaker dependent mode, since the user authentication procedure is performed only for specific speakers, user authentication may be performed faster. However, authentication may fail for users who are not registered (or selected) as speaker dependent mode.

On the other hand, since speaker independent mode performs user authentication for all speakers registered in the database, the probability of authentication failure is very low. However, the time required for user authentication increases compared to speaker dependent mode.

When the user authentication procedure is initiated, the smart rearview mirror control device may determine whether the currently set authentication applied speaker mode is a speaker dependent type or a speaker independent type (S630).

As a result of the determination, in the case of speaker dependent mode, the smart rearview mirror control device may perform user authentication only for specific speakers pre-registered (or pre-selected) (S640).

As a result of the determination in step S630, in the case of speaker independent mode, the smart rearview mirror control device may perform user authentication for all speakers registered in the database (S650).

FIG. 7 is a block diagram for illustrating the configuration of a voice recognition AI-based smart rearview mirror system according to an embodiment.

Referring to FIG. 7, a smart rearview mirror system 700 may comprise a microphone 710, a voice recognition processor 720, a main controller 730, a camera system 740, and a smart rearview mirror 750.

The camera system 740 according to an embodiment may comprise a left side view camera 741, a right side view camera 742, a front view camera 743 and a rear view camera 744, but this is merely an embodiment, and the camera system 740 may comprise more or fewer cameras.

In another embodiment, the camera system 740 may comprise a surround view monitor (SVM) camera. The SVM camera may be installed in the front/rear/left/right side of the vehicle to provide a wide view (front camera view) as well as a front top view (or front surround view) (front/left/right camera composite view), left side view (left camera view), right side view (right camera view), rear view (rear camera view), rear top view (or rear surround view) (rear/left/right camera composite view), etc.

As another embodiment, the camera system 740 may comprise a smart parking assistance system (SPAS) sensor. In this case, the main controller 730 may detect a proximate obstacle based on sensing information received from the SPAS sensor. When detecting a proximate obstacle, the main controller 730 may display proximate obstacle detection information through the smart rearview mirror 750. For example, the main controller 730 may identify the location of the detected obstacle based on sensing information received from the SPAS sensor. The main controller 730 may match the identified obstacle to the camera view screen corresponding to the identified obstacle location and display the same through the smart rearview mirror 750. For example, when an obstacle is detected on the left side of the vehicle, the main controller 730 may transmit an image including an obstacle detection result in an image captured by the left side camera to the smart rearview mirror 750 and display the image. Through this, the driver may intuitively check where the proximate obstacle is located.

Hereinafter, a procedure of a voice recognition AI-based smart rearview mirror system 700 configuring the screen of the smart rearview mirror 750 will be described in detail.

A user's voice signal input through the microphone 710 may be transmitted to a voice recognition processor 720.

After removing noise from the received voice signal, the voice recognition processor 720 may process the voice signal in natural language through a built-in voice recognition engine to extract a keyword, in other words, a user's voice command.

The main controller 730 may control to transmit a corresponding camera-captured image to the camera system 740 based on the user's voice command received from the voice recognition processor 720.

The main controller 730 may configure a corresponding view screen to be displayed on the smart rearview mirror 750 based on the image signal received from the camera system 740, and transmit the configured view screen to the smart rearview mirror 750 for display. As illustrated in FIG. 8, the view screen that may be configured by the main controller 730 may be configured in various ways according to the user's voice command.

FIG. 8 is an example of a view screen provided by a smart rearview mirror system according to an embodiment.

Referring to FIG. 8, the view screens that may be displayed on the smart rearview mirror 750 may largely include a left camera view screen 810, a right camera view screen 820, both sides camera view screen 830, a front camera view screen 840, a front (or rear) surround view screen 850 and a bird's eye view screen 860.

The smart rearview mirror system 700 may adaptively configure the view screen according to a user's voice command and display the same on the smart rearview mirror 750.

When the smart rearview mirror system 700 according to an embodiment detects a proximate obstacle in conjunction with the SPAS sensor, obstacle detection information may be further displayed on one side of the view screen. Here, obstacle detection information may include information on the location of obstacle and information on the type of obstacle, but is not limited thereto.

In an embodiment, according to the type of view screen, in other words, view type, the smart rearview mirror 750 may include some mirror regions as illustrated in reference numerals 810 to 840.

FIG. 9 is a block diagram for illustrating the detailed structure of a smart rearview mirror system according to an embodiment of the present invention.

As illustrated in FIG. 9, the smart rearview mirror system 900 may largely comprise a smart rearview mirror control device 910, a communication board 920, a display board 930, and a sensor board 940.

The communication board 920 may be connected to the vehicle ECU and/or the vehicle terminal 921 to perform communication. For example, the communication board 920 may receive an image captured through the camera of another vehicle through the vehicle terminal 921 according to the request of the smart rearview mirror control device 910 and transmit the image to the smart rearview mirror control device 910.

Also, the communication board 920 may be connected to the smart rearview mirror 750 and transmit a view screen configured by the smart rearview mirror control device 910 to the smart rearview mirror 750.

The display board 930 may be connected to an LED 931, and the display board 930 may display user interface screen of the smart rearview mirror system 900 and various status information on the LED 931 according to the control signal of the smart rearview mirror control device 910. The display board 620 may control the LED 931 to AOD operation mode.

The sensor board 940 may be connected to at least one of the illuminance sensor 941, the proximate sensor 942, the touch sensor 943, the fingerprint sensor 944, the iris sensor 945, and the microphone 710, and the sensing information obtained from the corresponding sensor may be provided to the smart rearview mirror control device 910. The smart rearview mirror control device 910 may perform operations such as gesture recognition, user authentication, and user voice command identification based on the sensing information received from at least one of the illuminance sensor 941, the proximate sensor 942, the touch sensor 943, the fingerprint sensor 944, the iris sensor 945, and the microphone 710.

Also, the sensor board 940 may be connected to the camera system 740. The sensor board 940 may receive a captured image from a corresponding camera according to a control signal of the smart rearview mirror control device 910 and provide the received image to the smart rearview mirror control device 910.

In addition, the sensor board 940 may be connected to the SPAS sensor 946. The sensor board 940 may provide the sensing information received from the SPAS sensor 946 to the smart rearview mirror control device 910. For example, the smart rearview mirror control device 910 may detect a proximate obstacle based on the sensing information from the SPAS sensor 946.

The sensor board 940 may perform a calibration operation for the sensors connected upon initialization.

The illuminance sensor 941 may measure illuminance around the smart rearview mirror control device 910 and/or the smart rearview mirror 750. The sensor board 940 may transfer the collected illuminance sensing information to the main controller 640.

Referring to FIG. 9, a smart rearview mirror control device 910 may comprise a main controller 950, a memory 960, and various engines.

Here, the engine may comprise a voice command recognition engine 970, a gesture recognition engine 980, a touch recognition engine 990, a user authentication engine 995, etc.

The main controller 950 may transmit a screen brightness control command according to the illuminance sensing information to the display board 930 to dynamically control the brightness of the output screen of the LED 931 and the output screen of the smart rearview mirror 750 according to the ambient illuminance.

The proximate sensor 942 may be used to sense a user gesture within a predetermined distance in a status in which the AOD screen is in inactive status. For example, when the proximate sensor 942 detects a change in capacitance greater than or equal to a predetermined reference value, sensing information on the detected change in capacitance may be transmitted to the main controller 950 through the sensor board 940. As another example, the proximate sensor 942 may include a hall sensor, and detect change in illuminance through the hall sensor. Sensing information on the change in illuminance measured by the proximate sensor 942 may be transmitted to the main controller 950 through the sensor board 940. Information sensed by the proximate sensor 942 may be used to recognize and identify a user gesture.

The main controller 950 may recognize and identify a user gesture corresponding to proximate sensing information using the gesture recognition engine 980.

The main controller 950 may activate the LED 931 screen in AOD operation mode based on the identified user gesture.

In addition, when the LED 931 screen in AOD operation mode is activated, the main controller 950 may configure a user interface screen for controlling the smart rearview mirror and transmit the configured user interface screen to the display board 930 to be displayed on an LED 931 screen.

When the main controller 950 obtains touch sensing information from the touch sensor 943, the user's touch operation may be identified using the touch recognition engine 990.

The main controller 950 may configure a view screen according to the identified touch operation and transmit the same to the smart rearview mirror 750 through a communication board 920.

The main controller 950 may convert the control mode of the smart rearview mirror 750 from a manual control mode to a voice control mode or from a voice control mode to a manual control mode according to the identified touch operation.

For example, in manual control mode, the view screen of the smart rearview mirror 750 may be dynamically controlled according to the user's menu selection on the user interface screen, and in voice control mode, the view screen of the smart rearview mirror 750 may be dynamically controlled based on the user's voice command.

According to an embodiment, the user authentication engine 995 may include at least one of a voice identification engine 996, an iris identification engine 997, a fingerprint identification engine 998, and an authentication level determination engine 999.

The main controller 950 may extract characteristic data based on at least one of fingerprint sensing information obtained from the fingerprint sensor 944, image sensing information obtained from the iris sensor 945, voice sensing information on the user's voice input through the microphone 710, and iris sensing information collected from the iris sensor 945, and dynamically determine the authentication level for the corresponding user through machine learning on the extracted characteristic data.

The voice identification engine 996 may extract characteristic data of the user's voice based on the voice sensing information, compare the extracted voice characteristic data with pre-learned voice template data, and determine an authentication weight for the corresponding voice characteristic data.

The voice identification engine 996 may improve voice recognition sensitivity by removing the noise included in the voice signal.

The iris identification engine 997 may extract characteristic data of the user's iris based on the image sensing information, compare the extracted iris characteristic data with pre-learned iris template data, and determine an authentication weight for the corresponding iris characteristic data.

The fingerprint identification engine 998 may extract characteristic data of the user's fingerprint based on the fingerprint sensing information, compare the extracted fingerprint characteristic data with pre-learned fingerprint template data, and determine an authentication weight for the corresponding fingerprint characteristic data.

The main controller 950 may determine an authentication level for the corresponding user based on the authentication weight determined for each characteristic data.

The main controller 950 may align the characteristic data in ascending order of authentication weight, and add up the authentication weight until the cumulative sum of the authentication weight of the aligned characteristic data reaches a predetermined threshold.

When the cumulative sum of the authentication weight is greater than or equal to a threshold value, the main controller 960 may determine the authentication level based on the type and number of summed characteristic data.

For example, when a threshold value is reached only with the authentication weight corresponding to the voice characteristic data, the authentication level may be determined as a first level. On the other hand, when the cumulative sum of the authentication weight corresponding to the voice characteristic data and the authentication weight corresponding to the iris characteristic data is greater than or equal to a threshold value, the authentication level may be determined as a second level. When the cumulative sum of the authentication weight corresponding to the voice characteristic data, the authentication weight corresponding to the iris characteristic data, and the authentication weight corresponding to the fingerprint characteristic data is greater than or equal to a threshold value, the authentication level may be determined as a third level.

The memory 960 may store characteristic data and authentication levels for each user.

In addition, pre-learned template data for each authentication type may be maintained in the memory 960.

The main controller 950 may control operations of the smart rearview mirror control device described above with reference to FIGS. 1 to 8.

When user authentication is completed, the voice command recognition engine 940 may process the user's voice signal input in natural language through the microphone 710 to extract the keyword, and provide the extracted keyword to the main controller 950.

The main controller 950 may dynamically configure a view screen based on the keyword received from the voice command recognition engine 940, in other words, user's voice command, and transmit the configured view screen to the smart rearview mirror 750 through a communication board 920.

Steps of a method or algorithm described in relation to the embodiments disclosed in the present specification may be directly implemented as hardware executed by a processor, a software module, or a combination of the two. A software module may reside in a storage medium (i.e., memory and/or storage) such as a RAM memory, a flash memory, a ROM memory, an EPROM memory, an EEPROM memory, a register, a hard disk, a removable disk, and a CD-ROM.

An exemplary storage medium is coupled to the processor, and the processor may read information from the storage medium and write information thereon. Alternatively, the storage medium may be integral with the processor. The processor and storage medium may reside in an application specific integrated circuit (ASIC). An ASIC may reside in a user terminal. Alternatively, the processor and storage medium may reside as separate components in a user terminal.

The above description is only an illustrative example of the technical idea of the present invention, and various modifications and variations can be made by those skilled in the art without departing from the essential characteristics of the present invention.

Therefore, the embodiments disclosed in the present invention are not intended to limit the technical idea of the present invention, but to explain, and the scope of the technical idea of the present invention is not limited by these embodiments. The protection scope of the present invention should be construed according to the claims below, and all technical ideas within the equivalent range should be construed as being included in the scope of the present invention.

What is claimed is:

1. A smart rearview mirror control method in a smart rearview control device installed in a vehicle, comprising:
    performing a booting procedure according to power application;
    recognizing user gesture when the screen of an always-on-display (AOD) touch display is inactive;
    activating the inactivated touch display screen according to the recognition of the user gesture, outputting a user interface screen for controlling the smart rearview mirror, and then waiting for a user voice input;
    performing machine learning on a user voice signal input through a microphone to recognize a voice command for user authentication and smart rearview mirror control; and
    in case the user authentication is successful, configuring a view screen based on the recognized voice command and displaying the same on the smart rearview mirror; and
    further comprising detecting a user's touch operation on the user interface screen based on the fact that the control mode of the smart rearview mirror is in manual control mode, and
    when the touch operation is detected, recognizing a smart camera control command corresponding to the touch operation and configuring the view screen by obtaining a corresponding camera-captured image according to the recognized smart camera control command.

2. The method of claim 1, wherein the booting procedure comprises:
    initializing a main controller controlling the overall input and output of the smart rearview mirror control device;
    connecting communication with a plurality of cameras;
    initializing a display board to control the touch display screen output; and
    initializing a sensor board configured to calibrate at least one sensor and collect sensing information from the at least one sensor;
    wherein the sensor comprises at least one of an illuminance sensor, a proximate sensor, a touch sensor, a fingerprint sensor and an iris sensor.

3. The method of claim 1, wherein the user authentication comprises speaker independent authentication performing authentication only for a specific speaker pre-registered and speaker dependent authentication for performing authentication for all speakers registered in a database.

4. The method of claim 1, further comprising:
    determining a view type corresponding to the recognized voice command based on the fact that the control mode of the smart rearview mirror is in voice control mode;
    determining at least one camera to receive a captured image corresponding to the determined view type; and
    configuring the view screen based on the captured image obtained from the determined at least one camera,
    wherein the view type comprises at least one of a front view, a left side view, a right side view, a rear view, a left/right side view, a front surround view, a rear surround view and a bird's eye view.

5. The method of claim 1, comprising:
    initiating a user registration procedure according to a predetermined user menu selection on the user interface screen;
    extracting characteristic data for each user authentication means;
    extracting first characteristic data by recognizing a user's voice from a voice signal input through the microphone;
    extracting second characteristic data by recognizing a user's iris through an iris sensor;
    extracting third characteristic data by recognizing a user's fingerprint through a fingerprint sensor;
    determining an authentication weight for each characteristic data based on first to third template data pre-learned in correspondence to the first to third characteristic data, respectively; and
    determining an authentication level for the corresponding user based on the authentication weight determined for each characteristic data,
    wherein the extracted characteristic data for each user and information on the determined authentication level are stored and managed in an internal memory.

6. The method of claim 1, further comprising:
    detecting a proximate obstacle using a smart parking assistance system (SPAS) sensor provided while driving the vehicle,
    wherein information on the detected proximate obstacle is displayed on one side of the view screen based on the proximate obstacle detected.

7. A smart rearview control system installed in a vehicle, comprising:
    a microphone providing a voice signal input by a user;
    a smart rearview mirror provided with a digital display device;
    a camera system capturing the front, left/right sides, and rear of the vehicle; and
    a smart rearview control device performing voice recognition on the voice signal using a built-in voice recognition engine based on the fact that the control mode of the smart rearview mirror is in voice control mode, receiving an image captured by at least one camera from the camera system according to a user's voice command identified through the voice recognition, dynamically configuring a view screen based on at least one of the received images, providing the configured view screen to the smart rearview mirror, detecting a user's touch operation on the user interface screen based on the fact that the control mode of the smart rearview mirror is in manual control mode, recognizing a camera control command corresponding to the detected touch operation, configuring the view screen by receiving an image captured by at least one camera from the camera system according to the recognized camera control command, and providing the configured view screen to the smart rearview mirror.

8. The system of claim 7, wherein the smart rearview mirror control device further performs user authentication based on the voice signal, and the user authentication comprises speaker independent authentication performing authentication only for a specific speaker pre-registered and speaker dependent authentication for performing authentication for all speakers registered in a database.

9. The system of claim 7, wherein the smart rearview mirror control device detects a proximate obstacle using a smart parking assistance system (SPAS) sensor provided while driving the vehicle, and displays information on the detected proximate obstacle on one side of the view screen based on the proximate obstacle detected.

* * * * *